US012560918B2

(12) United States Patent     (10) Patent No.: US 12,560,918 B2

Wu et al.     (45) Date of Patent: Feb. 24, 2026

(54) PRODUCTION SEQUENCING OPTIMIZATION FOR AUTOMOTIVE ACCESSORY INSTALLATION

(71) Applicant: TOYOTA MOTOR NORTH AMERICA, INC., Plano, TX (US)

(72) Inventors: Nick S. Wu, Frisco, TX (US); Anthony D. Sanor, Melissa, TX (US)

(73) Assignees: TOYOTA MOTOR NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 428 days.

(21) Appl. No.: 18/175,598

(22) Filed: Feb. 28, 2023

(65) Prior Publication Data

US 2024/0288854 A1    Aug. 29, 2024

(51) Int. Cl.
    *G05B 19/418*     (2006.01)
(52) U.S. Cl.
    CPC . *G05B 19/41865* (2013.01); *G05B 19/41805* (2013.01); *G05B 19/41885* (2013.01)
(58) Field of Classification Search
    CPC ........ G05B 19/41865; G05B 19/41805; G05B 19/41885
    See application file for complete search history.

(56) References Cited

U.S. PATENT DOCUMENTS 5,093,772 A * 3/1992 Senda ................ G05B 19/0421
                 700/12
5,506,783 A * 4/1996 Tanaka ................... G06Q 10/04
                 700/101
6,141,598 A * 10/2000 Nam ..................... B23P 21/004
                 700/95

(Continued)

FOREIGN PATENT DOCUMENTS

DE      202016006396 U1    11/2016
WO      2021154408 A1     8/2021

OTHER PUBLICATIONS

Holweg, M., & Miemczyk, J. (2003). Delivering the '3-day car'—the strategic implications for automotive logistics operations. Journal of purchasing and supply management, 9(2), 63-71.

(Continued)

*Primary Examiner* — Kamini S Shah
*Assistant Examiner* — Jonathan Michael Skrzycki
(74) *Attorney, Agent, or Firm* — HAYNES AND BOONE, LLP

(57) ABSTRACT

A system is provided for determining a vehicle production sequence. The system includes production bays, at least one assembly line, and a storage area holding a number of vehicles. A processor executes operations to determine a first sequence in which the vehicles are moved from the storage area to the at least one production bay. The processor also determines a second sequence in which the vehicles are moved from the production bays to the assembly line(s); a (Continued)

1300

1310 — DETERMINE SEQUENCE FOR MOVING VEHICLES FROM STORAGE AREA TO PRODUCTION BAYS

1320 — DETERMINE SEQUENCE FOR MOVING VEHICLES FROM PRODUCTION BAYS TO CONVEYOR OF ASSEMBLY LINE

1330 — DETERMINE TIME REQUIRED FOR EACH VEHICLE IN THE PRODUCTION BAYS

1340 — DETERMINE LINE SPEED REQUIRED FOR THE ASSEMBLY LINE

1350 — DETERMINE NUMBER OF VEHICLES PRODUCED

1360 — GENERATE REPORT time required by each vehicle in the production bays; and a required line speed of the at least one assembly line. Based on these determinations, the processor determines the number of vehicles predicted to exit the assembly line(s) during a work shift. The processor then outputs a report that includes the first sequence and the second sequence.

19 Claims, 10 Drawing Sheets

(56)                References Cited

U.S. PATENT DOCUMENTS

| | | | | |
|---|---|---|---|---|
| 6,546,302 | B1* | 4/2003 | Bergeon | G06Q 10/087 |
| | | | | 700/100 |
| 6,970,756 | B2 | 11/2005 | Levionnois | |
| 8,033,380 | B2 | 10/2011 | Tsujihama et al. | |
| 10,317,891 | B2 | 6/2019 | Clark et al. | |

| | | | | |
|---|---|---|---|---|
| 2002/0128810 | A1* | 9/2002 | Craig | G05B 17/02 |
| | | | | 703/17 |
| 2005/0182505 | A1* | 8/2005 | Onizawa | G05B 19/41865 |
| | | | | 700/103 |
| 2008/0262885 | A1* | 10/2008 | Jain | G06Q 10/0633 |
| | | | | 705/28 |
| 2009/0112350 | A1* | 4/2009 | Yuan | G05B 19/41835 |
| | | | | 700/117 |
| 2013/0060371 | A1* | 3/2013 | Kienzle | G06Q 10/06316 |
| | | | | 700/100 |

OTHER PUBLICATIONS https://www.inform-software.com/automotive/finished-vehicle-logistics.

Coleman, B. J., & Vaghefi, M. R. (1994). Heijunka (?): A key to the Toyota production system. Production and Inventory management Journal, 35(4), 31.

\* cited by examiner

220

710 — INPUT PRODUCTION CARRYOVER UNITS

720 — IDENTIFY OPEN TIME SLOTS NEXT PROD DAY

730 — SELECT EARLIER TIME SLOT WITH REQUIRED CAPACITY

750 — SEQUENCING PLAN

740 — UPDATE DAILY PROGRESS ADJUSTMENT TABLE

230

815 — ENDLESS LINE

810 — INPUT ENDLESS LINE OUTPUT

820 — UPDATE SITE LEVEL PRODUCTION BOARD

830 — UPDATE SITE LEVEL SEQUENCING KEY PERFORMANCE INDICATORS

240

915 — DAILY ADJUSTMENT

910 — INPUT DAILY PROGRESS ADJUSTMENT

920 — UPDATE SHOP LEVEL PRODUCTION BOARD

930 — UPDATE SHOP LEVEL SEQUENCING KEY PERFORMANCE INDICATORS

250

1010 — CALCULATE INVENTORY SAFETY STOCK

1020 — OBTAIN ACTUAL PRODUCTION RATE

1025 — INSTALL TRANSACTIONS

1030 — OPTIMIZE SAFETY STOCK BASED ON ACTUAL PRODUCTION RATES

260

1115 — RFID LOCATION

1110 — COLLECT RFID INFORMATION FEED TO REFRESH VEHICLE LOCATION AND PRODUCTION STATUS

1120 — OBTAIN PRODUCTION PARTS EVENTS

VIN STATUS EVENTS

1125

1130 — REAL TIME OPTIMIZED SEQUENCE FLOW BASED ON UPSTREAM PARTS PRODUCTION RATES

1250

PROCESSOR CIRCUIT

PROCESSOR 1260   1264

MEMORY

INSTRUCTIONS

1266

COMMUNICATION MODULE

1268

1300

1310 — DETERMINE SEQUENCE FOR MOVING VEHICLES FROM STORAGE AREA TO PRODUCTION BAYS

1320 — DETERMINE SEQUENCE FOR MOVING VEHICLES FROM PRODUCTION BAYS TO CONVEYOR OF ASSEMBLY LINE

1330 — DETERMINE TIME REQUIRED FOR EACH VEHICLE IN THE PRODUCTION BAYS

1340 — DETERMINE LINE SPEED REQUIRED FOR THE ASSEMBLY LINE

1350 — DETERMINE NUMBER OF VEHICLES PRODUCED

1360 — GENERATE REPORT

PRODUCTION SEQUENCING OPTIMIZATION FOR AUTOMOTIVE ACCESSORY INSTALLATION

COPYRIGHT NOTICE

TECHNICAL FIELD

The subject matter described herein relates generally to vehicle assembly, and, more particularly, to systems and methods for production sequencing optimization for automotive accessory installation. This vehicle production sequencing system has particular but not exclusive utility for automotive production lines installing accessories on finished vehicles.

BACKGROUND

Variations in vehicle configurations (i.e., vehicle variants) can create challenges for a build-to-stock approach to production sequencing. For example, because a number of different options or accessories may be available for each vehicle type, and these options may be purchased not only in grouped packages but also individually, some vehicle models may include hundreds, thousands, or more combinatorial variants. As a result, dealer stocks of vehicles often do not meet customer needs, leading to approximately 50% of customers purchasing vehicles that do not have all the desired available options, or to experiencing long lead times in receiving a built-to-order vehicle. From the time an order is placed, a fully accessorized vehicle can take several months to be delivered to the end customers, with the largest contributor to such delay often being the queuing time at a vehicle accessory installation center. Furthermore, many fully accessorized vehicles are not delivered on time.

Typically, once a vehicle is scheduled for accessory installation, it is parked outside the accessory installation center in a parking lot with other scheduled vehicles, which are brought in for accessory installation in either a first-in-first-out or last-in-first-out order. However, these simple queuing strategies often result in "unrouteable" steps, e.g., steps which cannot be completed before the end of the current work shift. Such unrouteable steps tie up space, equipment, and personnel, and are thus a primary driver of queueing delays.

As a result of all of the above, approximately 60% of vehicle buyers desire to disintermediate the dealer and purchase a built-to-order vehicle online.

Therefore, a need exists in the art for systems and methods that offer improved queueing for accessory installation centers. For example, a need exists for systems and methods that create a unique and optimized production sequence for accessory installation on finished vehicles to reduce the queuing at accessory installation centers.

The information included in this Background section of the specification, including any references cited herein and any description or discussion thereof, is included for technical reference purposes only and is not to be regarded as subject matter by which the scope of the disclosure is to be bound.

SUMMARY

Disclosed is a vehicle production sequencing system. When a vehicle is scheduled for installation of accessories chosen by a customer or dealership, the vehicle is brought to an accessory installation center and parked outside in a parking lot. Currently, vehicles are processed in a first-in-first-out (FIFO) or last-in-first-out (LIFO) queuing order. However, when a production center includes a mix of cellular and assembly line production steps, these queuing strategies become a primary driver of delays and late deliveries. The vehicle production sequencing system of the present disclosure ensures load leveling for assembly lines and production bays, and a production mix that mirrors market demand, and thus creates a stable production environment. The system improves sequencing accuracy and vehicle flow on the shop floor. The vehicle production sequencing system shows an improvement in total output and number of dealers serviced each day, and a decrease in lead times for built-to-order vehicles.

The vehicle production sequencing system disclosed herein has particular, but not exclusive, utility for accessory installation for finished cars and trucks. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for determining a vehicle production sequence. The system includes at least one production bay, at least one assembly line, a storage area, and a plurality of vehicles stored in the storage area. The system also includes a processor configured to execute a sequencing process that may include operations to: determine a first sequence in which the vehicles of the plurality of vehicles are moved from the storage area to the at least one production bay; determine a second sequence in which the vehicles of the plurality of vehicles are moved from the at least one production bay to the at least one assembly line; determine a time required by each vehicle of the plurality of vehicles in the at least one production bay; determine a required line speed of the at least one assembly line; determine a number of vehicles predicted to exit the at least one assembly line during a work shift, based on: the first sequence, the second sequence, the time required by each vehicle of the plurality of vehicles in the at least one production bay, and the required line speed of the at least one assembly line. The sequencing process also includes operations to output a report that may include at least the first sequence and the second sequence. Other embodiments of this aspect include corresponding computer systems, apparatus, and computer programs recorded on one or more computer storage devices, each configured to perform the actions of the methods.

Implementations may include one or more of the following features. In some embodiments, the first sequence is selected to maximize the number of vehicles predicted to exit the at least one assembly line during the work shift. In some embodiments, the plurality of vehicles includes at least two brands, and the first sequence is selected to match a mix of brands exiting the at least one assembly line to a desired mix of brands. In some embodiments, the plurality of vehicles includes at least two models, and the first sequence is selected to match a mix of models exiting the at least one assembly line to a desired mix of models. In some embodiments, the plurality of vehicles may include at least two accessories or accessory packages, and the first sequence is selected to match a mix of accessories or accessory packages exiting the at least one assembly line to a desired mix of accessories or accessory packages. In some embodiments, the first sequence includes vehicles for which production can be started but not completed before an end time of the work shift. In some embodiments, the second sequence includes vehicles for which production was begun during a previous shift and can be completed during the work shift. In some embodiments, the processor is configured to execute the sequencing process before a start time of the work shift. In some embodiments, the processor is further configured to update, during the work shift, based on production data obtained during the work shift, at least one of the first sequence, the second sequence, the line speed, or the number of vehicles predicted to exit the at least one assembly line during the work shift. In some embodiments, the processor is further configured to update, during the work shift, based on an availability of parts during the work shift, at least one of the first sequence, the second sequence, the line speed, or the number of vehicles predicted to exit the at least one assembly line during the work shift. Implementations of the described techniques may include hardware, a method or process, or computer software on a computer-accessible medium.

One general aspect includes a method for determining a vehicle production sequence. The method includes determining a first sequence in which the vehicles of a plurality of vehicles are moved from a storage area to at least one production bay. The method also includes determining a time required by each vehicle of the plurality of vehicles in the at least one production bay. The method also includes determining a second sequence in which the vehicles of the plurality of vehicles are moved from the at least one production bay to at least one assembly line. The method also includes determining a required line speed of the at least one assembly line. The method also includes determining a number of vehicles predicted to exit the at least one assembly line during a work shift, based on: the first sequence, the second sequence, the time required by each vehicle of the plurality of vehicles in the at least one production bay, and the required line speed of the at least one assembly line. The method also includes outputting a report that may include at least the first sequence and the second sequence. Other embodiments of this aspect include corresponding computer systems, apparatus, and computer programs recorded on one or more computer storage devices, each configured to perform the actions of the methods.

Implementations may include one or more of the following features. In some embodiments, the first sequence is selected to maximize the number of vehicles predicted to exit the at least one assembly line during the work shift. In some embodiments, the plurality of vehicles includes at least two brands or models, and the first sequence is selected to match a mix of brands or models exiting the at least one assembly line to a desired mix of brands. In some embodiments, the plurality of vehicles includes at least two accessories or accessory packages, and the first sequence is selected to match a mix of accessories or accessory packages exiting the at least one assembly line to a desired mix of accessories or accessory packages. In some embodiments, the first sequence includes vehicles for which production can be started but not completed before an end time of the work shift; or the second sequence includes vehicles for which production was begun during a previous shift and can be completed during the work shift. In some embodiments, the method is executed before a start time of the work shift. In some embodiments, the method may include updating, during the work shift, based on production data obtained during the work shift, at least one of the first sequence, the second sequence, the line speed, or the number of vehicles predicted to exit the at least one assembly line during the work shift. In some embodiments, the method may include updating, during the work shift, based on an availability of parts during the work shift, at least one of the first sequence, the second sequence, the line speed, or the number of vehicles predicted to exit the at least one assembly line during the work shift. Some embodiments include a non-transitory computer-readable storage medium storing instructions, which when executed by at least one processor of a computer system, causes the computer system to carry out the method. Implementations of the described techniques may include hardware, a method or process, or computer software on a computer-accessible medium.

One general aspect includes a system for determining a vehicle production sequence. The system includes a plurality of production bays, at least one assembly line, a parking lot, and vehicles stored in the parking lot. The system also includes a processor configured to: determine a first sequence in which the vehicles of the plurality of vehicles are moved from the parking lot to at least some production bays of the plurality of production bays; determine a time required by each vehicle of the plurality of vehicles in the at least some production bays of the plurality of production bays; based on the first sequence and the time required by each vehicle of the plurality of vehicles in the at least some production bays of the plurality of production bays, determine a second sequence in which the vehicles of the plurality of vehicles are moved from the plurality of production bays to the at least one assembly line; determine a required line speed of the at least one assembly line based on: the first sequence, the second sequence, and the time required by each vehicle of the plurality of vehicles in the at least some production bays of the plurality of production bays; determine a number of vehicles predicted to exit the at least one assembly line during a work shift, based on: the first sequence, the second sequence, the time required by each vehicle of the plurality of vehicles in the at least some production bays of the plurality of production bays, and the required line speed of the at least one assembly line; and output a report may include at least the first sequence and the second sequence. The first sequence may for example be selected to maximize the number of vehicles predicted to exit the at least one assembly line during the work shift. Other embodiments of this aspect include corresponding computer systems, apparatus, and computer programs recorded on one or more computer storage devices, each configured to perform the actions of the methods.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the vehicle production sequencing system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
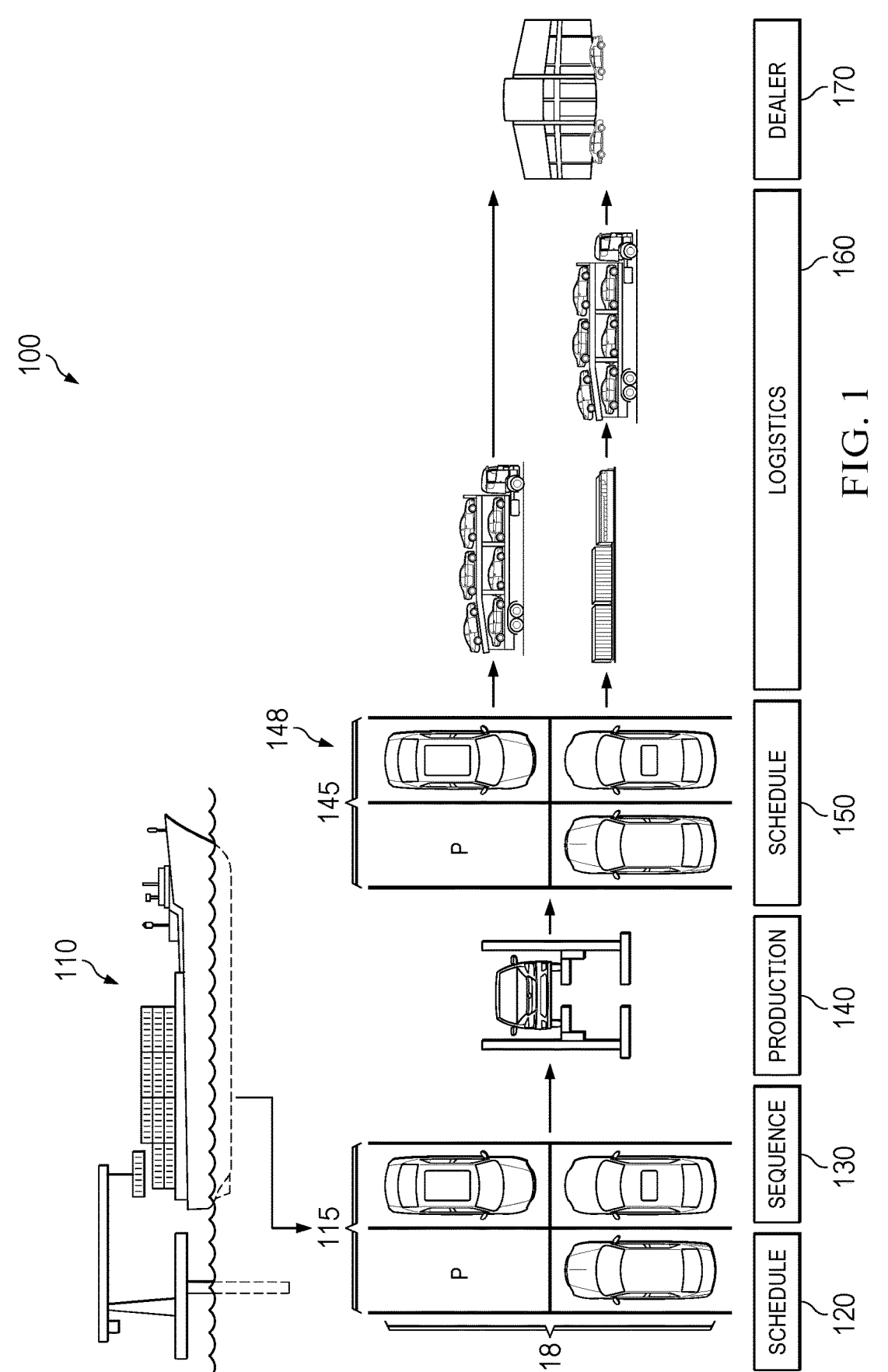
FIG. 1 is schematic, diagrammatic representation of a production logistics process, in accordance with at least one embodiment of the present disclosure.

When a vehicle is scheduled for installation of accessories chosen by a customer or dealership, the vehicle is brought to an accessory installation center and parked outside in a parking lot along with other scheduled vehicles. These vehicles are currently brought inside the center for accessory installation in either a first-in-first-out (FIFO) or last-in-first-out (LIFO) order, regardless of vehicle type or the accessories that need to be installed. However, these queuing strategies, while simple to implement, often results in "unrouteable" steps, e.g., steps that, once started, cannot be completed before the end of the current work shift. Typically, then, the production of a vehicle with unrouteable steps must be delayed until the start of the next shift. Such unrouteable steps can therefore tie up space, equipment, and personnel, and are thus a primary driver of queueing delays.

More effective queuing strategies exist for "endless line" conveyor-based assembly lines, where for example a new vehicle may be loaded onto the conveyor every 60 seconds. However, optimized queuing strategies are more challenging for "cellular manufacturing", e.g., production facilities that use maintenance bays or production bays.

Determination of optimal queuing for vehicle accessory installation centers has been hindered by the fact that the accessory installation center may include both an endless line and a number of production bays. For example, vehicle options or accessories that require the vehicle to be lifted may be installed in a production bay. Such options or accessories include, but are not limited to, wheels, lock nuts, tires, brakes, exhaust systems, tow hitches, and others. In some cases, multiple production bays may exist for each type of vehicle accessory, such that, for example, five vehicles may receive wheel accessories simultaneously. Similarly, vehicle options or accessories that require access to the engine compartment, the vehicle exterior, or the vehicle interior may be installed on the conveyor line, which accepts vehicles one at a time. Such accessories include but are not limited to media systems, trim packages, floor mats, and headlights.

An additional complication is that the desired mix of vehicles at a dealership may not match the ordering of vehicles in the parking lot. For example, a particular dealership ordering sixteen vehicles may want three vehicles of Type A, three vehicles of Type B, and ten vehicles of Type C, whereas the next ten vehicles in a FIFO or LIFO queue may be ten vehicles of Type A, which can generate further delays, as it takes longer to assemble the completed shipment of vehicles for that dealer. Optimal sequencing of the removal of vehicles from the queue must therefore include foreknowledge of the desired target mix of vehicles.

Because this heterogeneous mix of vehicles, accessories, and production resources vastly increases the number of possible queuing sequences, good methods do not currently exist for determining the optimal sequence in which to move queued vehicles from the parking lot to the conveyor line or a production bay.

To address this problem in the art, disclosed herein is a vehicle production sequencing system that determines an optimal or near-optimal order in which to sequence queued vehicles for accessory installation.

The vehicle production sequencing system significantly improves the existing technology by distributing the production of different body types and accessories evenly over the course of a day, a week, and a month in the assembly process. To achieve this goal, the vehicle production sequencing system ensures an efficient production mix that mirrors market demand along with leveling and balance of the production lines and bays. Focusing on these elements creates a stable production environment designed to meet customer demand. Complexity is more significant when there is a mix of conveyor and cellular-based manufacturing at the same site where one method feeds another. Additional manufacturing complexity arises when there is variation in part installation time from one vehicle to another. The ability to incorporate optimized sequencing, along with logistics optimization, and visual control within a manufacturing site that utilizes a mixed interdependent manufacturing method, provides a unique capability both to improve manufacturing throughput and to more closely tailor production outputs to dealer demand.

Important features of the vehicle production sequencing system include the operationalized principles of an optimized logistics schedule and optimization within the accessory installation process of finished vehicles at an accessory installation site that uses interconnected conveyor and cellular manufacturing. The system improves sequencing accuracy and shop floor vehicle flow. The vehicle production sequencing system has demonstrated an improvement in total output, in the balance and leveling of production lines, an increase in the total number of dealers serviced each day, and a decrease in lead times for built-to-order vehicles.

Various embodiments of the present disclosure include a method for determining a sequence for accessory installation. The system includes a processor for generating a vehicle identification number (VIN) work pool. From the VIN list, the system generates an assembly line work pool and a production bay work pool based on available resources. In some instances, a vehicle may go directly from the parking lot to the endless line, and from the endless line to a logistics area for distribution. In other cases, a vehicle may go to a first production bay, and from there may go through a sequence of additional production bays (in an example, between zero and five additional production bays). Once all production bay installations are complete, in some instances, the vehicle may be fully accessorized and moved to a logistics area for distribution. In other cases, the vehicle may be moved from its final production bay to the start of the endless line conveyor for the installation of additional accessories. For convenience, the examples shown in the present disclosure follow this model of production bays first and assembly line second. It is understood that other ordering may be used instead or in addition, without departing from the spirit of the present disclosure.

The present disclosure aids substantially in the production of motor vehicles, by improving the queuing, sequencing, and flow of vehicles on the shop floor of a production facility such as an accessory installation center. Implemented on a mixed cellular and assembly line production facility whose machinery is in communication with one or more centralized processors, the vehicle production sequencing system disclosed herein provides practical improvements in the average time required to produce a vehicle, by improving the number of vehicles that can be produced in a work shift. This improved manufacturing process transforms a parking lot full of waiting vehicles into an orderly, optimized production queue, without the normally routine "starvation" and "overwhelm" of the assembly line as vehicles exit the production bays at different times. This unconventional approach improves the functioning of the accessory installation center, by ensuring that vehicles are moved into the production bays, and from there to the conveyor of the assembly line or endless line, in an optimized order that maximizes the number of vehicles produced in a shift.

The vehicle production sequencing system may be implemented as a process at least partially viewable on a display, and operated by a control process executing on a processor that accepts user inputs from a keyboard, mouse, or touchscreen interface, and that is in communication with one or more sensors, switches, etc. in the production bays and on the assembly line. In that regard, the control process performs certain specific operations in response to different inputs or selections made at different times and in response to different stimuli. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the vehicle production sequencing system. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is schematic, diagrammatic representation of a production logistics process 100, in accordance with at least one embodiment of the present disclosure. In the example shown in FIG. 1, finished vehicles 115 are received at a port 110 or similar facility and delivered to a parking lot 118 or other queueing location. A production schedule 120 is computed for the finished vehicles 115, after which a sequence 130 is determined. For mixed cellular and line manufacturing facilities, the sequence is traditionally a FIFO or LIFO queue.

Based on the sequence 130, the finished vehicles 115 are moved into the production facility (e.g., an accessory installation facility), where they become fully accessorized vehicles 145, which are then delivered to a logistics holding area 148 (e.g., another parking lot), where a shipping schedule 150 determines their movement into a logistics process 160 where they are loaded onto trucks or trains for delivery to dealerships 170.

A primary chokepoint in the flow of finished vehicles 115 from the port 110 to the dealerships 170 is the amount of time the vehicles 115 spend in the production queue parking lot 118. Thus, an object of the present disclosure is to provide systems and methods for computing optimal sequences that maximize throughput, minimize dwell times within the production queue, and tailor the queue's output more precisely to the orders placed by the dealerships 170.

Before continuing, it should be noted that the examples described above are provided for purposes of illustration, and are not intended to be limiting. Other devices and/or device configurations may be utilized to carry out the operations described herein.

Figure 2:
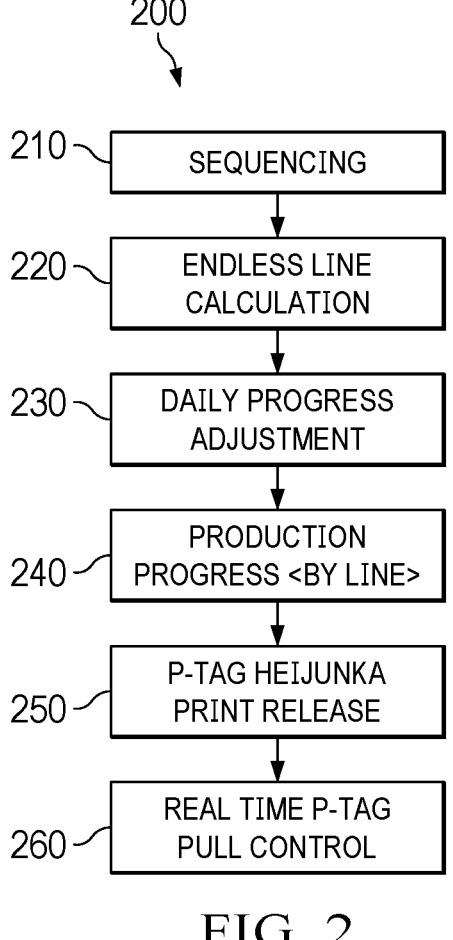
FIG. 2 is an exemplary representation, in block diagram form, of at least a portion of a vehicle production sequencing system, in accordance with at least one embodiment of the present disclosure.

FIG. 2 is an exemplary representation, in block diagram form, of at least a portion of a vehicle production sequencing system 200, in accordance with at least one embodiment of the present disclosure. In the example shown in FIG. 2, the vehicles (e.g., the VINs of the vehicles) are fed into a sequencing module 210, which determines a preliminary sequence for moving vehicles from the parking lot to the production facility. The preliminary sequence is then received by an endless line calculation module, which determines, based on the preliminary sequence, when each vehicle is expected to arrive at the conveyor for the endless line or assembly line. The preliminary sequence may, at certain points, overwhelm the assembly line by delivering multiple vehicles at the same time, whereas the assembly line can only accept one vehicle at a time (e.g., one vehicle per minute). At other points, the preliminary sequence may "starve" the line by failing to deliver vehicles at times when the conveyor is ready to receive a vehicle. Thus, the preliminary sequence is adjusted by the endless line calculation module 220 to eliminate or reduce the occurrence of line overwhelm or line starvation.

The adjusted sequence is then received by a progress adjustment module 230, which makes real-time adjustments to the production sequence based on actual progress made in the production facility. For example, some accessory installations may take longer than expected, and some may take less time than expected, such that it would be sub-optimal to continue to follow the adjusted sequence produced by the endless line calculation module 220. The progress adjustment module may, by default, execute a minimum of once per day (e.g., 15 minutes before the start of every shift), but depending on the implementation, it may be advantageous to execute it more often, such as once per hour, once per half-hour, or even once per minute.

The daily or hourly adjusted sequence is then received by a production progress module 240, which individually monitors the progress of each assembly line and each production bay, and may for example recommend (e.g., visualize) improvement areas if a particular production bay is consistently operating at a lower-than-average or higher-than-average speed. Next, the sequence is received by a P-tag print release module 250, which prints, displays, or otherwise communicates the individual work instructions for each team member in the shop. Finally, the sequence is received by a real-time P-tag pull control module 260, which ensures that the pace of work instructions is tied to the pace of the developed sequencing plan.

It is noted that block diagrams are provided herein for exemplary purposes; a person of ordinary skill in the art will recognize myriad variations that nonetheless fall within the scope of the present disclosure. For example, block diagrams may show a particular arrangement of components, modules, services, steps, processes, or layers, resulting in a particular data flow. It is understood that some embodiments of the systems disclosed herein may include additional components, that some components shown may be absent from some embodiments, and that the arrangement of components may be different than shown, resulting in different data flows or material flows while still performing the methods described herein.

It is further noted that the development of even a preliminary sequence can require tens of thousands or even hundreds of thousands of individual calculations. Performing all of the calculations of the vehicle production sequencing system 200 further multiplies this computational burden. Additionally, the outputs of the vehicle production sequencing system are production sequences (e.g., printed or displayed reports containing a production sequence), the execution of which relies at least partially on automated systems within the production facility and/or the production logistics process.

Figure 3:
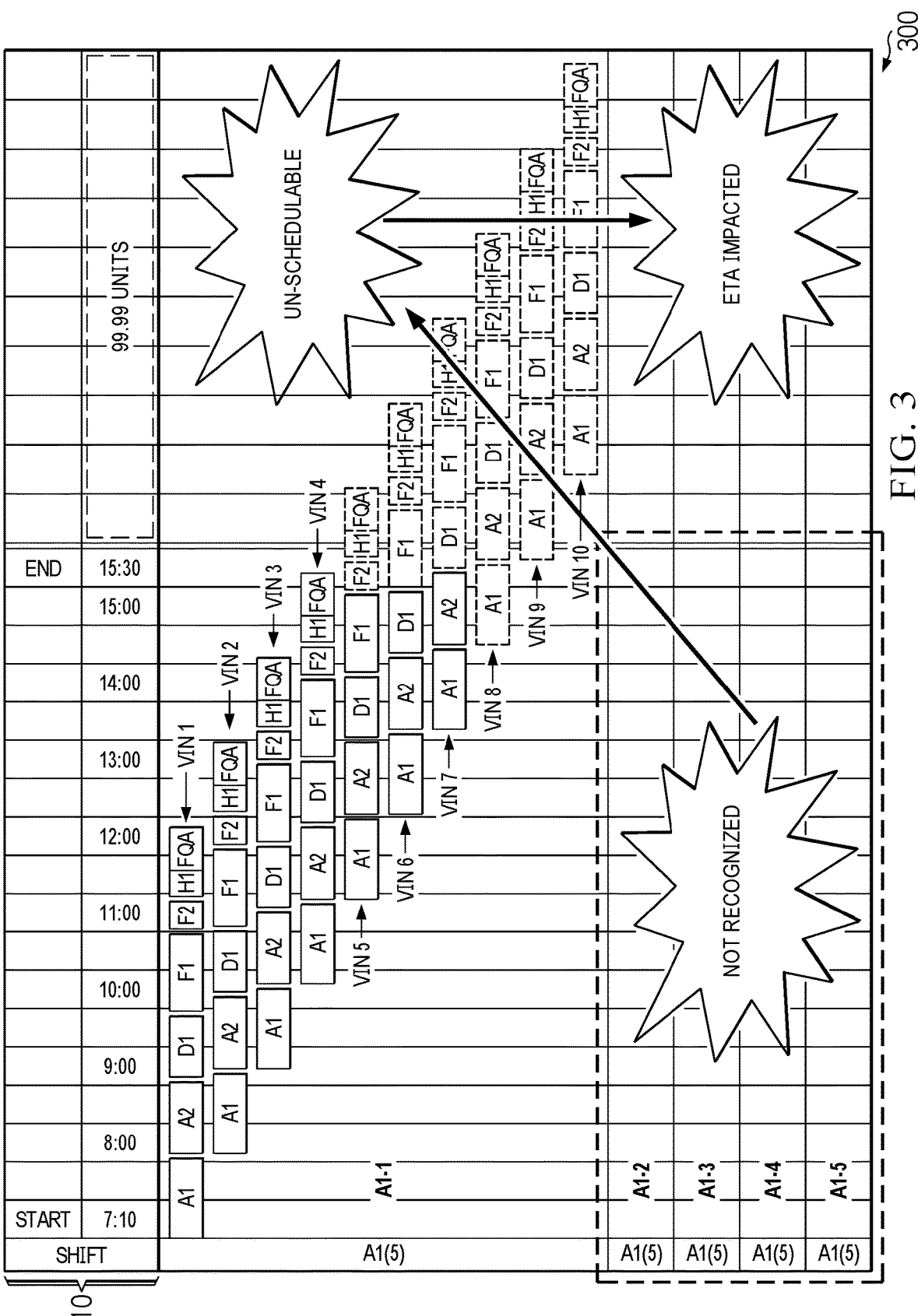
FIG. 3 is a time chart showing the flow of multiple vehicles through a production facility such as an accessory installation center, in accordance with at least one embodiment of the present disclosure.

FIG. 3 is a time chart 300 showing the flow of multiple vehicles VIN 1-VIN 10 through a production facility such as an accessory installation center, in accordance with at least one embodiment of the present disclosure. The time chart 300 includes a time axis 310 showing the time elapsed between the start and end of a production shift. Each horizontal row of the time chart 300 represents a different vehicle. In the example shown in FIG. 3, sequencing is done using traditional sequencing techniques, such as a FIFO or LIFO queue and a linear (1D) sequence of production stations.

In the example shown in FIG. 3, the production facility includes 5 identical production bays, A1-1 through A1-5 at the first production station A1, that are each capable of performing the same or similar operations. However, existing sequencing methods do not take into account that multiple vehicles can begin production at the same time. Thus, existing methods may not schedule any vehicles to begin production in bays A1-2 through A1-5 at the same time that a vehicle is beginning production in bay A1-1.

In the example shown in FIG. 3, vehicle VIN 1 begins production in station A1, bay A1-1 at 7:00 AM, and then progresses to station A2 at 8:15 AM, to station D1 at 9:15 AM, to station F1 at 10:00 AM, to station F2 at 11:15 AM, and to station H1 at 11:45 AM. From there, vehicle VIN1 is delivered to the conveyor of the assembly line FQA.

In a similar way, vehicles VIN 2, VIN 3, and VIN 4 proceed from station A1 through multiple other production bays until they reach the conveyor of the assembly line FQA. Thus, each of vehicles VIN 1-VIN 4 is delivered to the assembly line FQA before the end of the shift. Since the assembly line FQA operates in a linear manner, it is normal and expected that there will be vehicles in the assembly line FQA when it is shut down for the night. However, existing sequencing methods are not able to account for uncompleted vehicles to be left in production bays overnight in a mixed manufacturing site configuration (e.g., both cell-based and assembly-line-based manufacturing). Thus, although vehicle VIN 5 comes after vehicle VIN 4 in the production sequence, it would not be delivered to the assembly line FQA until approximately 4:15 PM, which is after the end of she shift. Thus, the last three production steps F2, H1, and FQA are "unrouteable" for vehicle VIN 5, and thus vehicle VIN 5 cannot be scheduled for production that day. The same is true for vehicles VIN 6-VIN 10.

Thus, because bays A1-2 through A1-5 are not utilized as starting points for vehicle production, and because vehicles VIN 5-VIN 10 are not schedulable that day, the delivery ETA for vehicles VIN 5-VIN 10 must be pushed out by at least one day. In the example shown in FIG. 3, the throughput for the production facility is only 4 vehicles per day, or 40% of the desired throughput.

It is an object of the present invention to improve throughput by optimizing production sequencing with an algorithm fully adapted to a hybrid assembly line and cellular manufacturing process.

Figure 4:
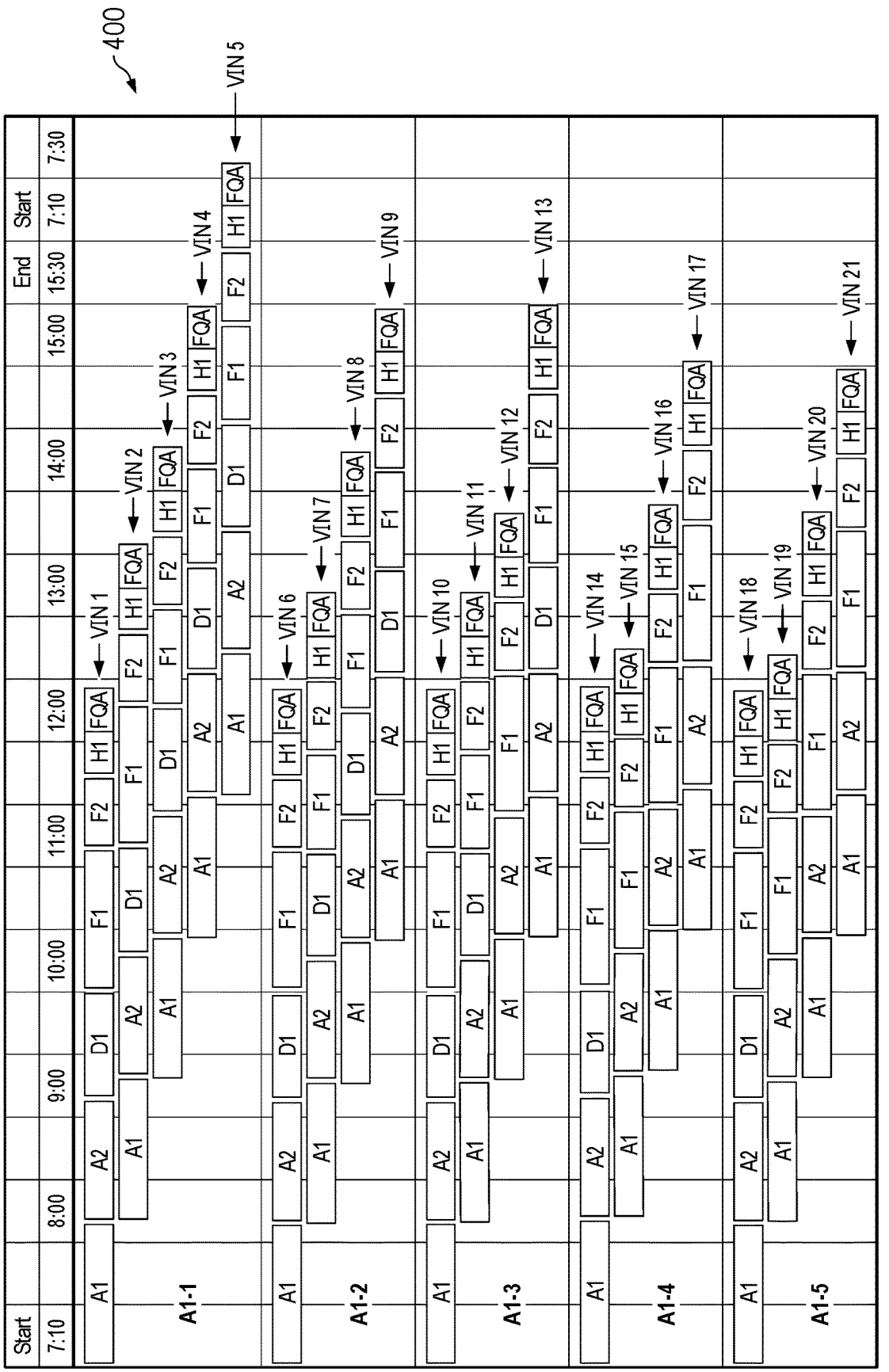
FIG. 4 is a time chart showing the flow of multiple vehicles through a production facility such as an accessory installation center, in accordance with at least one embodiment of the present disclosure.

FIG. 4 is a time chart 400 showing the flow of multiple vehicles VIN 1-VIN 21 through a production facility such as an accessory installation center, in accordance with at least one embodiment of the present disclosure. The time chart 400 includes a time axis 410 showing the time elapsed between the start and end of a production shift. Each horizontal row of the time chart 400 represents a different vehicle. In the example shown in FIG. 3, sequencing is done using improved sequencing techniques, such as an optimized queue and a planar (2D) sequence of production stations.

In the example shown in FIG. 4, the production facility's first production station A1 includes 5 identical production bays, A1-1 through A1-5, that are each capable of performing the same or similar operations. The optimized sequencing methods of the vehicle production sequencing system permit multiple vehicles to begin production at the same time, by assigning vehicles headed for station A1 to individual production in bays A1-2 through A1-5 at the same time that a vehicle is beginning production in bay A1-1.

The vehicle production sequencing system first develops an optimized production sequence as described above, and then, for each VIN in the sequence, places that VIN in the first available time slot, using a "max allow" variable that specifies the number of available production bays for each production station, thus allowing each station to accommodate multiple vehicles at the same time or at overlapping times. In addition, the vehicle production sequencing system accounts for the end time of the current shift using the product simulation time from the production schedule 120 (see FIG. 1). Furthermore, the vehicle production sequencing system allows the end time of a production step to cross over into the next day, such that it is allowable to leave a vehicle in a production bay overnight, with an installation only partially completed.

With these improvements, in the example shown in FIG. 4, vehicle VIN 1 begins production in bay area A1, bay A1-1 at 7:00 AM, and then progresses to station A2 at 8:15 AM, to station D1 at 9:15 AM, to station F1 at 10:00 AM, to station F2 at 11:15 AM, and to station H1 at 11:45 AM. From there, vehicle VIN1 is delivered to the conveyor of the assembly line FQA at approximately 12:15 PM.

In a similar way, vehicles VIN 2, VIN 3, and VIN 4 proceed from station A1 through multiple other production stations until they reach the conveyor of the assembly line FQA. Thus, each of vehicles VIN 1-VIN 4 is delivered to the assembly line FQA before the end of the shift. Since the assembly line FQA operates in a linear manner, it is normal and expected that there will be vehicles in the assembly line FQA when it is shut down for the night. However, unlike the example shown in FIG. 3, the vehicle production sequencing system permits uncompleted vehicles to be left in production bays overnight. Thus, vehicle VIN 5 is no longer un-schedulable, and can be completed early in the next day's shift, thus reducing production delays.

Furthermore, because the vehicle production sequencing system allows multiple vehicles to start production at the same time, vehicles VIN 6-VIN 9 now begin production at station A1 in bay A1-2, with a result that, instead of being un-schedulable, that are now each completed before the end of the shift. The same is true for vehicle VIN 10, which begins production at station A1 in bay A1-3. Thus, although the example of FIG. 3 shows vehicles VIN 6-VIN 10 as un-schedulable, in the example of FIG. 4 each of then is completed before the end of the shift.

In a similar way, the vehicle production sequencing system also allows vehicles VIN 11-VIN 21 to be completed before the end of the shift, resulting in an increase of throughput from 4 vehicles per day to 20 vehicles per day, with only one scheduled vehicle (vehicle VIN 5) not completed before the end of the shift. Thus, the vehicle production sequencing system shows a clear increase in production facility throughput, with a corresponding decrease in lead times and late deliveries.

Figure 5:
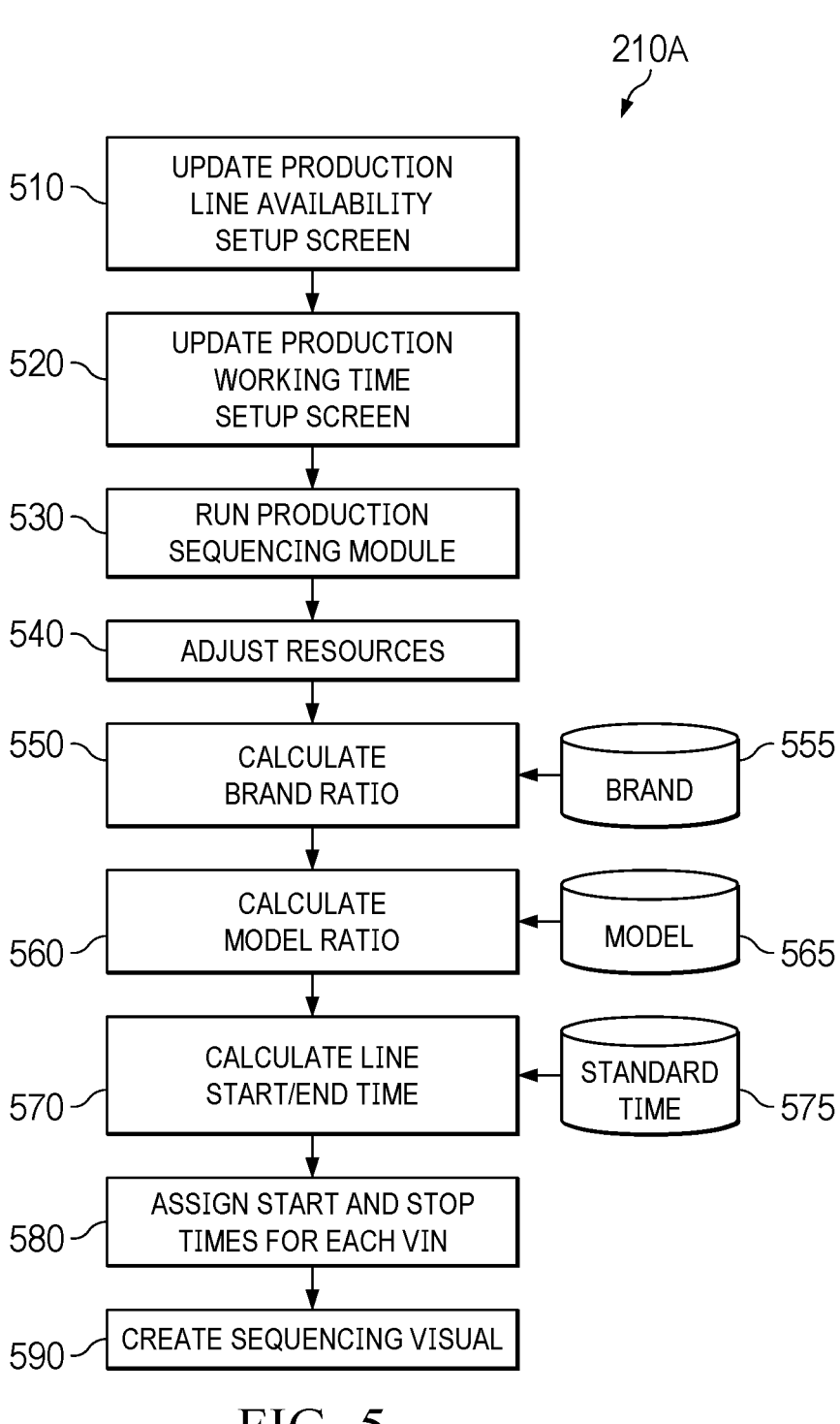
FIG. 5 is a flow diagram of an example cellular manufacturing sequencing method, in accordance with at least one embodiment of the present disclosure.

FIG. 5 is a flow diagram of an example cellular manufacturing sequencing method 210A, in accordance with at least one embodiment of the present disclosure. The method 210 may for example be used to determine a sequence in which vehicles may be moved from a parking lot or other storage area into production bays for the start of a production sequence. Depending on the implementation, the sequence created by the method 510A may also be used for timing and/or sequencing the movement of vehicles from one production bay to another, and/or from a production bay to the conveyor of the endless line or assembly line. It is understood that the blocks of method 210A may be performed in a different order than shown in FIG. 5, additional blocks can be provided before, during, and after the blocks, and/or some of the blocks described can be replaced or eliminated in other embodiments. One or more of blocks of the method 210A can be carried by one or more devices and/or systems described herein, such as components of the production logistics process 100, vehicle production sequencing system 200, and/or processor circuit 1250.

In block 510, the method 210A includes updating a list of production bays, assembly lines, and team member placements that are currently available for production in the upcoming shift. This information may for example be obtained by the production team and/or human resourced timekeeping systems (e.g., team members may have requested time off in advance). Execution then proceeds to block 520.

In block 520, the method 210A includes updating a list of working times required for each assembly line, production bay, and for the site overall. This information may for example be obtained by cross-referencing the work required to the bays and team members available. In an example, some production bays may be required to work overtime in order to meet the sequencing plan, while others may not. Execution then proceeds to block 530.

In block 530, the method 210A includes generating a preliminary production sequence by a simple FIFO or LIFO queueing algorithm for the available VINS currently in the parking lot or other storage area, with a secondary sort based on longest lead time and a tertiary sort based on vehicle make and model. Execution then proceeds to block 540.

In block 540, the method 210A includes adjusting the list of resourced available for the next shift. In an example, a preliminary production schedule based on this information may be completed five days in advance, and block 540 includes adjusting this information just before the start of reach shift, based on changes in availability such as unavailable machines, employee illnesses and vacations, etc. Execution then proceeds to block 550.

In block 550, the method 210A includes, from a database 555 of the available brands, calculating a desired brand ratio based on orders placed by dealerships. For example, some vehicles with the same basic body and engine may be branded as Brand A, and some may be branded as Brand B, with different price points, different markings, and different accessories. The next production shift should then produce a certain percentage of Brand A and a certain percentage of Brand B vehicles based either on current dealer orders, historical dealer orders, or a combination thereof. Execution then proceeds to block 560.

In block 560, the method 210A includes, from a database 565 of available models, calculating a desired model ratio based on orders placed by dealerships. For example, some vehicles of the same brand may be of Model X, and some may of Model Y, with different price points, different markings, and different accessories. The next production shift should then produce a certain percentage of Model X and a certain percentage of Model Y vehicles based either on current dealer orders, historical dealer orders, or a combination thereof. Execution then proceeds to block 570.

In block 570, the method 210A includes, from a calendar or other database, receiving or calculating the start and end times for each assembly, which may for example be the sum of the times required for each accessory installed in each production area, and thus the time interval or intervals available for sequencing accessory installations or other production steps. Execution then proceeds to block 580.

In block 580, the method 210A includes assigning start and stop times for each VIN in each production bay (or production area comprising multiple production bays). In an example, VINs are sequenced based on the standard installation time (in minutes) required for each desired accessory installation, with the first VIN being the VIN with the highest total install time, and the last VIN being the VIN with the lowest total install time, and, as a secondary sort criterion, sequencing those VINs first which have the oldest scheduled production (e.g., accessory installation) dates. The two sorted lists may be combined by various means known in the art.

Next, time slots are selected for the sequenced VINs. In an example, the method includes selecting the earliest time slot that matches the required total install time for that VIN. A time slot may, for example, include a starting location (e.g., a particular production bay), a start time that falls between the start and end times of the upcoming shift, and a completion time that either falls before the end time of the upcoming shift. Once a time slot is filled by a particular vehicle with a particular VIN, no other vehicle can occupy that time slot, as shown for example in FIG. 4. If no time slot is available that includes a completion time before the end of the shift, then the VIN is placed in the earliest "best fit" slot, which minimizes the amount of time required past the end of the shift.

Execution then proceeds to block 590.

In block 590, the method 210A includes outputting (e.g., to a printer or video display) a chart, table, or other visual report showing the sequenced vehicles in reference to the various production stations (see for example FIG. 4). The method is now complete.

It is noted that flow diagrams are provided herein for exemplary purposes; a person of ordinary skill in the art will recognize myriad variations that nonetheless fall within the scope of the present disclosure. For example, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, performing all of the computations shown in FIGS. 5-11 may require tens of thousands or hundreds of thousands of calculations, which may need to be performed every day, every shift, every hour, etc., depending on the implementation.

Figure 6:
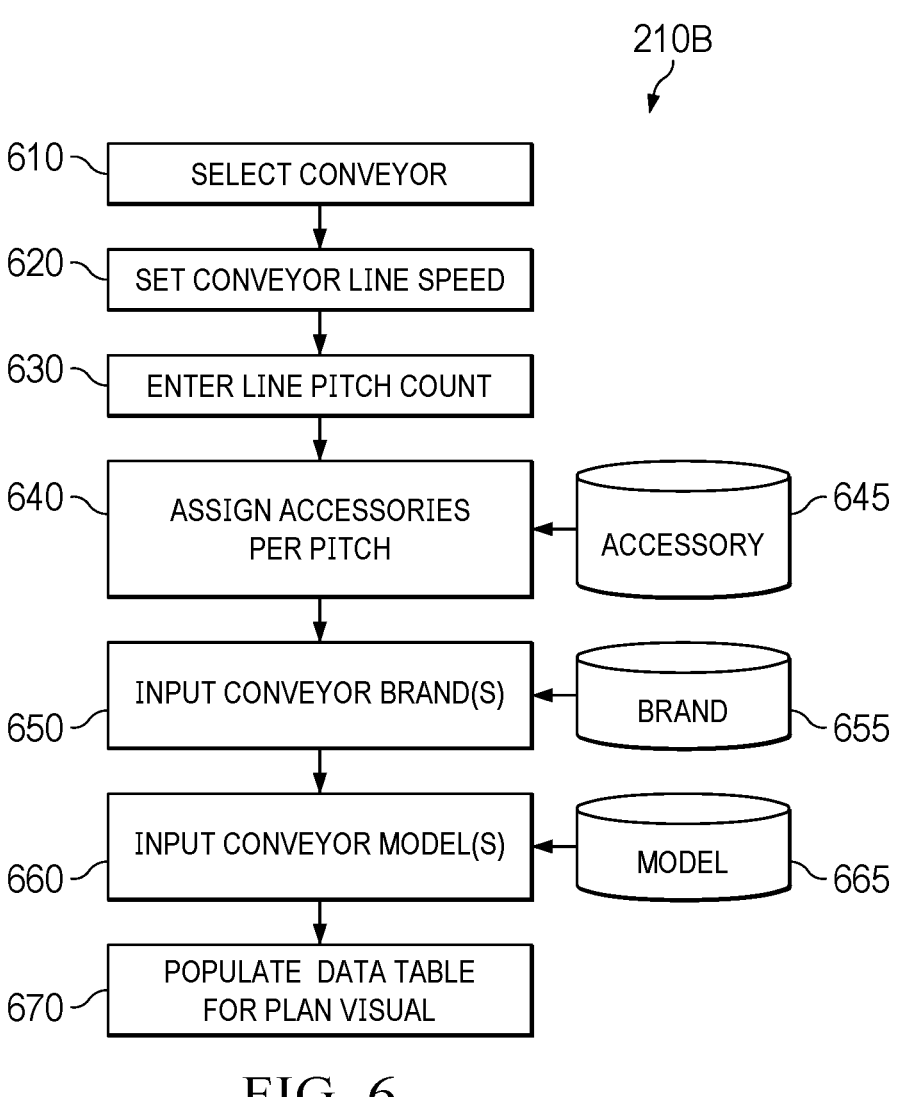
FIG. 6 is a flow diagram of an example conveyor sequencing method, in accordance with at least one embodiment of the present disclosure.

FIG. 6 is a flow diagram of an example conveyor sequencing method 210B, in accordance with at least one embodiment of the present disclosure.

In block 610, the method 210A includes selecting a conveyor, assembly line, or endless line, in the case where the production facility includes more than one available conveyor. Execution then proceeds to block 620.

In block 620, the method 210A includes setting the line speed of the conveyor. This may for example involve receiving a preliminary sequence, and sorting it such that vehicles or VINs requiring the most line time (e.g., in seconds) occur first in the sequence, and vehicles or VINs requiring the least line time occur last in the sequence. The method may then include taking the end time from the previous conveyor line pitch to establish the next conveyor line pitch relative start time, where a "pitch" is a space on a moving line where a particular team member starts and ends their work. The line speed is then the speed necessary to meet these start and stop times. The method may then include receiving optional input (e.g., from a line supervisor) to customize the line speed upward or downward from this initial calculation. The method may then include calculating a line start time and a line end time for each VIN, to determine which VINs can be completed before the end of the shift.

Execution then proceeds to block 630.

In block 630, the method 210A includes receiving or computing the line pitch count (e.g., the number of line pitches that will occur over the course of the shift). Execution then proceeds to block 640.

In block 640, the method 210A includes, based on a database of available accessories and the orders received from the dealerships, assigning which accessories will be installed in each pitch. Execution then proceeds to block 650.

In block 650, the method 210A includes, based on a database of available brands, determining which brand is in each of the pitches. Execution then proceeds to block 660.

In block 660, the method 210A includes, based on a database of available models, determining which model is in each of the pitches. Execution then proceeds to block 670.

In block 670, the method 210A includes outputting a chart, table, or other representational report of the final sequence (see for example FIG. 4). This may for example involve modifying or adding to the report generated in block 590 of FIG. 5. The method is now complete.

Figure 7:
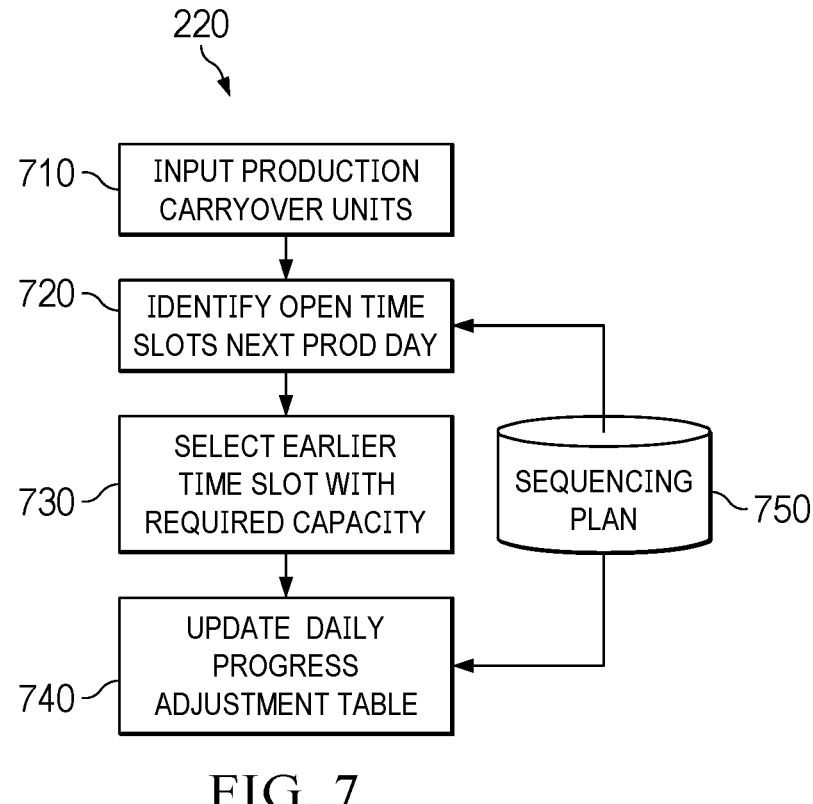
FIG. 7 is a flow diagram of an example endless line calculation method, in accordance with at least one embodiment of the present disclosure.

FIG. 7 is a flow diagram of an example endless line calculation method 220, in accordance with at least one embodiment of the present disclosure. The purpose of the endless line calculation is to ensure that any VINs that are not completed on the scheduled production day will have a defined slot time the next day.

In block 710, the method 220 includes receiving information regarding production carryover units, e.g., vehicles of VINs for which production was started during the previous shift but was not completed. These VINs must be completed during the next shift. Execution then proceeds to block 720.

In block 720, the method 220 includes identifying open time slots in the next shift, during which the production carryover units may be completed. Execution then proceeds to block 730.

In block 730, the method 220 includes, for each production carryover unit in turn, selecting the earliest available time slot that has the required duration and resources. Execution then proceeds to block 740.

In block 740, the method 220 includes updating the daily progress adjustment table. In an example, the original table is updated as the expectation was that it would be completed on day 1 but is overwritten by the endless line adjustment to day 2. The method is now complete.

Figure 8:
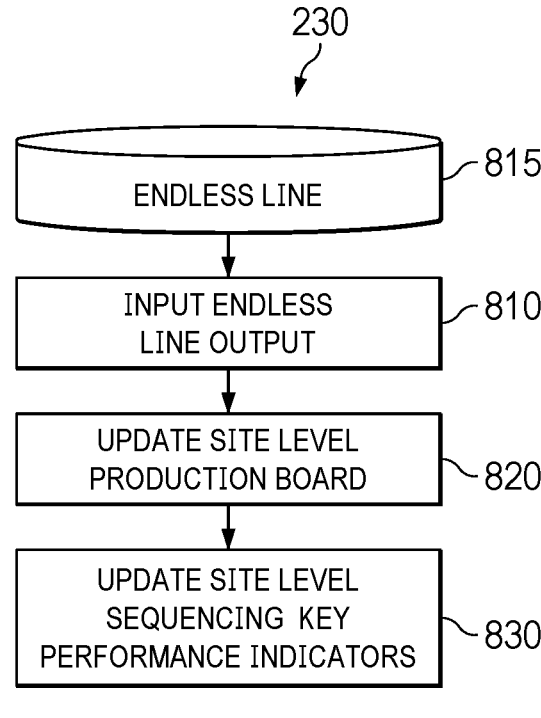
FIG. 8 is a flow diagram of an example daily progress adjustment method, in accordance with at least one embodiment of the present disclosure.

FIG. 8 is a flow diagram of an example daily progress adjustment method 230, in accordance with at least one embodiment of the present disclosure.

In block 810, the method 230 includes receiving status information 815 regarding the output of the conveyor, assembly line, or endless line. Execution then proceeds to block 820.

In block 820, the method 230 includes updating the visual representation of the production sequence (see, for example, FIG. 4) with current information on the actual status of the endless line. Execution then proceeds to block 830.

In block 830, the method 230 includes updating key site-level performance indicators for the computed production sequence. These indicators may include metrics such as % on-time delivery, number and percentage of vehicles completed to the sequencing plan, and (if not completed) the average amount of time over the standard. The method is now complete.

Figure 9:
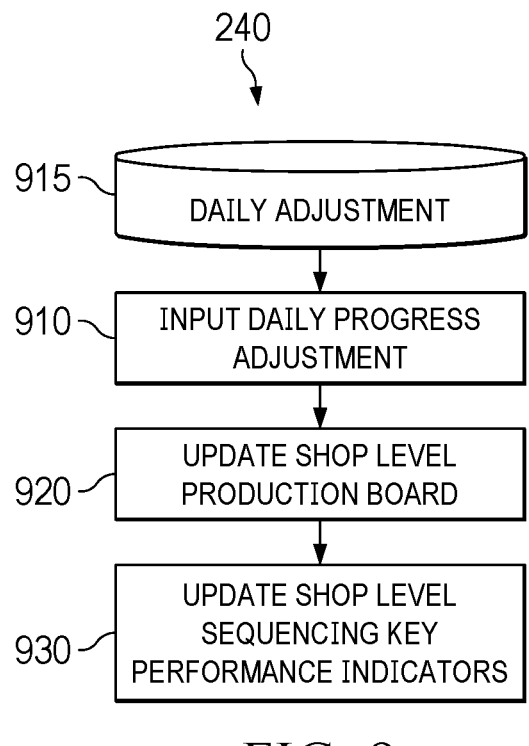
FIG. 9 is a flow diagram of an example production line progress measurement method, in accordance with at least one embodiment of the present disclosure.

FIG. 9 is a flow diagram of an example production line progress measurement method 240, in accordance with at least one embodiment of the present disclosure.

In block 910, the method 240 includes receiving information 915 regarding the actual daily progress of the shop. A shop may for example be a group of production bays that can install a common group of accessories. For example, wheel shop can do a variety of wheel packages for different cars but will only focus on wheels and tires. Execution then proceeds to block 920.

In block 920, the method 240 includes updating the shop level production board. In an example, this block updates the original plan based on the actual outcome of production, but at the level of an individual shop. For example, some units scheduled to be completed by the shop may not have finished and must be adjusted to the next day. Execution then proceeds to block 930.

In block 930, the method 240 includes updating shop-level key performance indicators. These indicators may include metrics such as the number and percentage of VINs completed to the plan, and the average amount of time over the standard if not completed. These measures apply at the level of the individual shop. The method is now complete.

Figure 10:
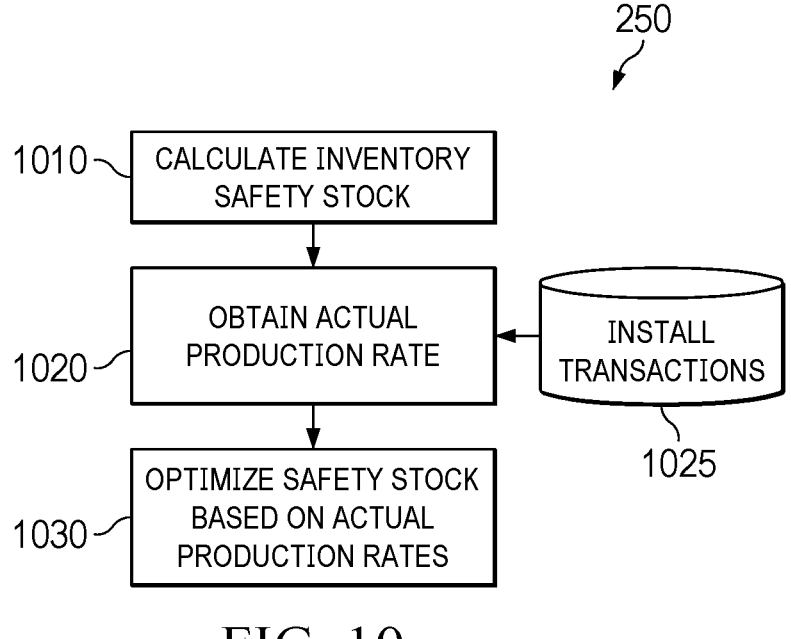
FIG. 10 is a flow diagram of an example P-tag print release method, in accordance with at least one embodiment of the present disclosure.

FIG. 10 is a flow diagram of an example P-tag print release method 250, in accordance with at least one embodiment of the present disclosure. P-tag stands for Production tag and may for example include the rate at which work and associated instructions will be accomplished. This method may for example help to control the rate at which this information is released.

In block 1010, the method 250 includes calculating the available safety stock in the inventory. Safety stock may for example be additional inventory of accessories available for installation into a vehicle, that are planned to reduce part shortages within production. Execution then proceeds to block 1020.

In block 1020, the method 250 includes computing an actual production rate (e.g., vehicles per hour, vehicles per shift, vehicles per day, etc.), based on a database 1025 of completed install transactions. Execution then proceeds to block 1030.

In block 1030, the method 250 includes optimizing the amount of safety stock (e.g., the number of vehicles that should be held in reserve as safety stock), based on the actual production rate calculated at block 1020. The method is now complete.

Figure 11:
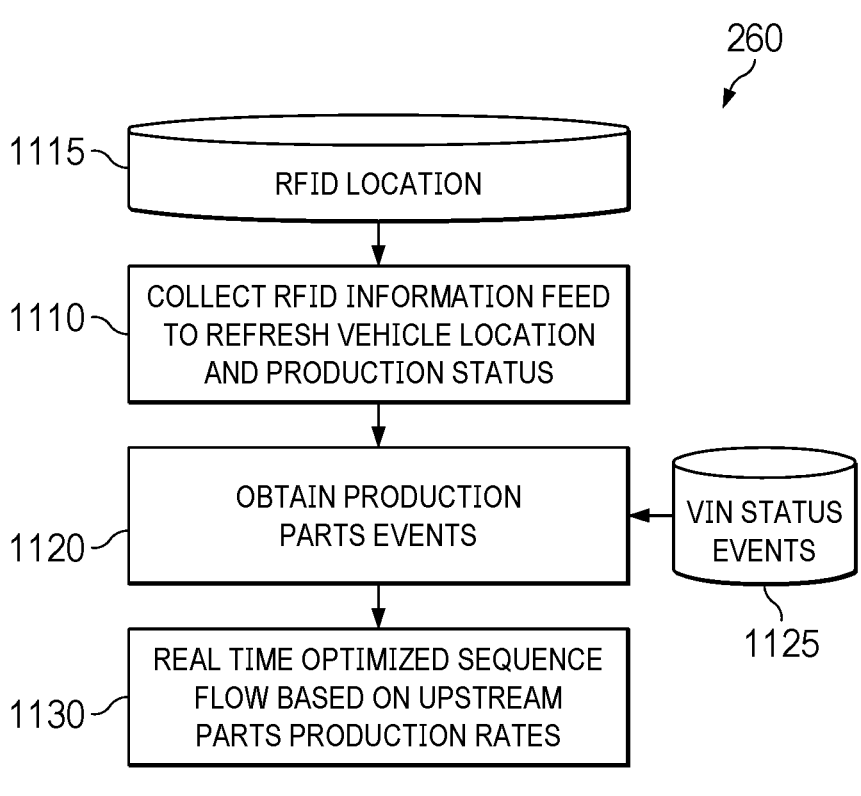
FIG. 11 is a flow diagram of an example real-time P-tag pull control method, in accordance with at least one embodiment of the present disclosure.

FIG. 11 is a flow diagram of an example real-time P-tag pull control method 260, in accordance with at least one embodiment of the present disclosure. In an example, producing too many of one brand, model, and accessory package in too short a time can overwhelm the delivery of parts, thus "starving" one or more production bays or assembly lines and stalling production. Thus, it is desirable in some instances to adjust the queuing (e.g., at any of blocks 210, 220, 230, 240, or 250 of FIG. 2) based on the availability of parts.

In block 1110, the method 260 includes collecting the RFID location 1115 of a particular vehicle or VIN within the facility, in order to refresh that vehicle's location and production status. Execution then proceeds to block 1120.

In block 1120, the method 260 includes obtaining production parts events or VIN status events 1125 (e.g., events where a part was installed on that particular vehicle or VIN). Execution then proceeds to block 1130.

In block 1130, the method 260 includes computing a real-time optimized sequence flow of vehicles and parts, based on upstream parts production rates. This update may be completed for each vehicle in the sequence. The method is now complete.

Figure 12:
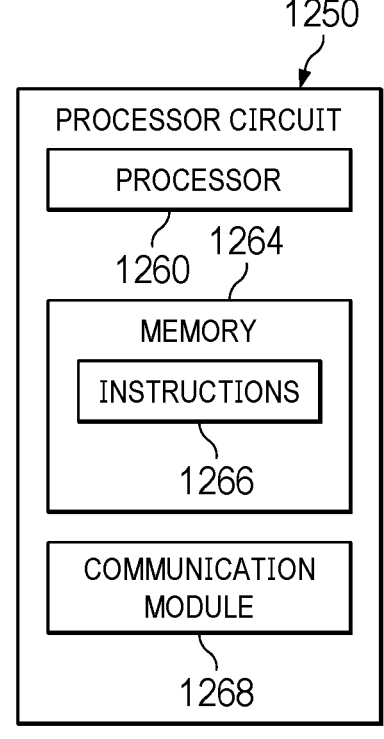
FIG. 12 is a schematic diagram of a processor circuit, according to embodiments of the present disclosure.

FIG. 12 is a schematic diagram of a processor circuit 1250, according to embodiments of the present disclosure. The processor circuit 1250 may be implemented in the vehicle production sequencing system 200, or other devices or workstations (e.g., third-party workstations, network routers, etc.), or on a cloud processor or other remote processing unit, as necessary to implement the method. As shown, the processor circuit 1250 may include a processor 1260, a memory 1264, and a communication module 1268. These elements may be in direct or indirect communication with each other, for example via one or more buses.

The processor 1260 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1260 may also comprise another hardware device, a firmware device, or any combination thereof configured to perform the operations described herein. The processor 1260 may also be implemented as a combination of computing devices, e.g., a combination of a DSP and a microprocessor, a plurality of microprocessors, one or more microprocessors in conjunction with a DSP core, or any other such configuration.

The memory 1264 may include a cache memory (e.g., a cache memory of the processor 1260), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1264 includes a non-transitory computer-readable medium. The memory 1264 may store instructions 1266. The instructions 1266 may include instructions that, when executed by the processor 1260, cause the processor 1260 to perform the operations described herein. Instructions 1266 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 1268 can include any electronic circuitry and/or logic circuitry to facilitate direct or indirect communication of data between the processor circuit 1250, and other processors or devices. In that regard, the communication module 1268 can be an input/output (I/O) device. In some instances, the communication module 1268 facilitates direct or indirect communication between various elements of the processor circuit 1250 and/or the vehicle production sequencing system 200. The communication module 1268 may communicate within the processor circuit

1250 through numerous methods or protocols. Serial communication protocols may include but are not limited to United States Serial Protocol Interface (US SPI), Inter-Integrated Circuit (I²C), Recommended Standard 232 (RS-232), RS-485, Controller Area Network (CAN), Ethernet, Aeronautical Radio, Incorporated 429 (ARINC 429), MOD-BUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and central server, or readings from the endless line) may be accomplished using any suitable wireless or wired communication technology, such as a cable interface such as a universal serial bus (USB), micro USB, Lightning, or FireWire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

Figure 13:
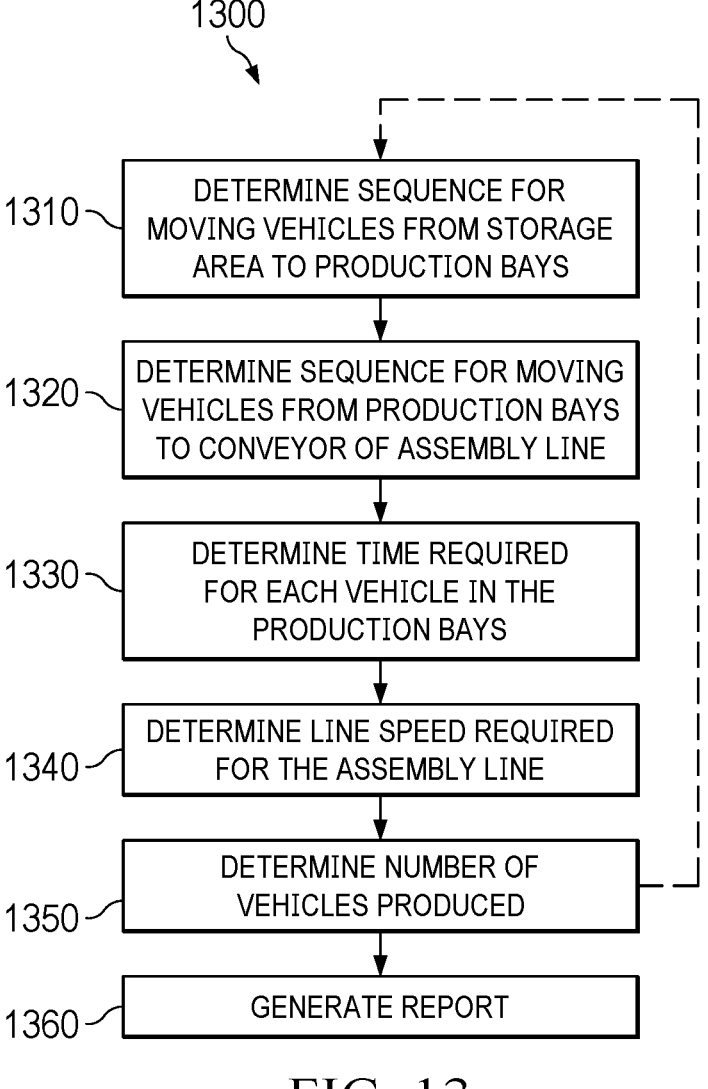
FIG. 13 is a flow diagram of an example vehicle production sequencing method, in accordance with at least one embodiment of the present disclosure.

FIG. 13 is a flow diagram of an example vehicle production sequencing method 1300, in accordance with at least one embodiment of the present disclosure.

In block 1310, the method includes determining a sequence in which vehicles are moved from the storage area to at least some of the available production bays, as described above. Execution then proceeds to block 1320.

In block 1320, the method includes determining a time required by each vehicle in the production bays through which it is scheduled to be processed. This time may for example be based on a standard time required or expected for the installation of particular accessories which the vehicle is scheduled to receive. Execution then proceeds to block 1330.

In block 1330, the method includes determining, based on the outputs of blocks 1310 and 1320, a sequence in which the vehicles are moved from the production bays to the conveyor of the assembly line (or, in cases where multiple assembly lines are available, a conveyor of one of the available assembly lines). Execution then proceeds to block 1340.

In block 1340, the method includes determining, based on the outputs of blocks 1310, 1320, and 1330, the line speed for the assembly line(s) in order to complete work on all of the vehicles in the sequence. If it is not possible to complete work on all of the sequenced vehicles in the current work shift, then the speed of the assembly line may be set to its highest practical value. Execution then proceeds to block 1350.

In block 1350, the method includes determining, based on the outputs of blocks 1310, 1320, 1330, and 1340, the number of vehicles predicted to exit assembly line(s) during the current or upcoming work shift. In general, the sequence in which vehicles are moved from the storage area to the production bays is selected to maximize the number of vehicles predicted to exit the at least one assembly line during the work shift. Thus, blocks 1310 through 1350 may need to be executed iteratively until either the determined sequence stops changing or the number of vehicles produced stops changing. Execution then proceeds to block 1360.

In block 1360, the method includes generating a report (e.g., a printed or displayed report) that shows the determined sequences and, in some cases, the number of vehicles expected to be produced during the work shift. The method is now complete.

As will be readily appreciated by those having ordinary skill in the art after becoming familiar with the teachings herein, the vehicle production sequencing system fills a advantageously replaces a simple FIFO or LIFO queuing system with one that is optimized, based on a desired mix of vehicle brands, vehicle models, and vehicle accessories or accessory packages, to maximize the number of vehicles that can be produced in a given day, while also more precisely tailoring the output mix to market demand and/or specific dealer orders or customer orders.

A number of variations are possible on the examples and embodiments described above. For example, although the examples shown in this document place all the cellular manufacturing steps at the beginning of the process, followed by all of the assembly line manufacturing steps, other ordering may be used instead or in addition, depending on the implementation, without departing from the spirit of the present disclosure.

Furthermore, the same principles could be applied to the manufacture of the vehicles themselves, rather than to installation of accessories on vehicles that are already built. The vehicles can, in principle, be any mix of consumer-type and commercial-type cars and trucks, with internal combustion, hybrid, or fully electric propulsion. Furthermore, the technology described herein may be applied not only to cars and trucks, but to other types of vehicles, including aircraft, watercraft, or other non-vehicular manufactured goods that are produced through a combination of cellular and assembly line manufacturing.

The logical operations making up the embodiments of the technology described herein are referred to variously as operations, steps, objects, elements, components, or modules. It should be understood that these may occur or be performed in any order, unless explicitly claimed otherwise or a specific order is inherently necessitated by the claim language. All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the vehicle production sequencing system. Connection references, e.g., attached, coupled, connected, joined, or "in communication with" are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the vehicle production sequencing system as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system for determining a vehicle production sequence, the system comprising:
    at least one production bay;
    at least one assembly line different from the at least one production bay;
    a storage area;
    a plurality of vehicles stored in the storage area;
    an automated production system; and
    a processor configured to execute a sequencing process comprising operations to:
    determine a first sequence in which vehicles of the plurality of vehicles are moved from the storage area to the at least one production bay;
    determine a second sequence in which vehicles of the plurality of vehicles are moved from the at least one production bay to the at least one assembly line;
    determine a time required by each vehicle of the plurality of vehicles in the at least one production bay;
    determine a required line speed of the at least one assembly line that maximizes throughput of the at least one assembly line and the at least one production bay;
    determine a number of vehicles predicted to exit the at least one assembly line during a work shift, based on:
      the first sequence,
      the second sequence,
      the time required by each vehicle of the plurality of vehicles in the at least one production bay, and
      the required line speed of the at least one assembly line;
    output a report comprising at least the first sequence, the second sequence, and the required line speed; and
    with the automated production system, operating the assembly line according to the second sequence and the required line speed.

2. The system of claim 1, wherein the first sequence is selected to maximize the number of vehicles predicted to exit the at least one assembly line during the work shift.

3. The system of claim 1, wherein the plurality of vehicles comprises at least two brands, and wherein the first sequence is selected to match a mix of brands exiting the at least one assembly line to a desired mix of brands.

4. The system of claim 1, wherein the plurality of vehicles comprises at least two models, and wherein the first sequence is selected to match a mix of models exiting the at least one assembly line to a desired mix of models.

5. The system of claim 1, wherein the plurality of vehicles comprises at least two accessories or accessory packages, and wherein the first sequence is selected to match a mix of accessories or accessory packages exiting the at least one assembly line to a desired mix of accessories or accessory packages.

6. The system of claim 1, wherein the first sequence includes vehicles for which production can be started but not completed before an end time of the work shift.

7. The system of claim 1, wherein the second sequence includes vehicles for which production was begun during a previous shift and can be completed during the work shift.

8. The system of claim 1, wherein the processor is configured to determine the first sequence, the second sequence, the time required by each vehicle, and the required line speed before a start time of the work shift.

9. The system of claim 8, wherein the processor is further configured to update, during the work shift, based on production data obtained during the work shift, at least one of the first sequence, the second sequence, the line speed, or the number of vehicles predicted to exit the at least one assembly line during the work shift.

10. The system of claim 8, wherein the processor is further configured to update, during the work shift, based on an availability of parts during the work shift, at least one of the first sequence, the second sequence, the line speed, or the number of vehicles predicted to exit the at least one assembly line during the work shift.

11. A method for determining a vehicle production sequence, the method comprising:
    determining a first sequence in which vehicles of a plurality of vehicles are moved from a storage area to at least one production bay;
    determining a time required by each vehicle of the plurality of vehicles in the at least one production bay;
    determining a second sequence in which vehicles of the plurality of vehicles are moved from the at least one production bay to at least one assembly line different from the at least one production bay;
    determining a required line speed of the at least one assembly line that maximizes throughput of the at least one assembly line and the at least one production bay;
    determining a number of vehicles predicted to exit the at least one assembly line during a work shift, based on:
      the first sequence,
      the second sequence,
      the time required by each vehicle of the plurality of vehicles in the at least one production bay, and
      the required line speed of the at least one assembly line;
      outputting a report comprising at least the first sequence and the second sequence and the required line speed; and
    with an automated production system, operating the assembly line according to the second sequence and the required line speed.

12. The method of claim 11, wherein the first sequence is selected to maximize the number of vehicles predicted to exit the at least one assembly line during the work shift.

13. The method of claim 11, wherein the plurality of vehicles comprises at least two brands or models, and wherein the first sequence is selected to match a mix of brands or models exiting the at least one assembly line to a desired mix of brands.

14. The method of claim 11, wherein the plurality of vehicles comprises at least two accessories or accessory packages, and wherein the first sequence is selected to match a mix of accessories or accessory packages exiting the at least one assembly line to a desired mix of accessories or accessory packages.

15. The method of claim 11, wherein:

the first sequence includes vehicles for which production can be started but not completed before an end time of the work shift; or the second sequence includes vehicles for which production was begun during a previous shift and can be completed during the work shift.

16. The method of claim 11, wherein the method is executed before a start time of the work shift.

17. The method of claim 16, further comprising updating, during the work shift, based on production data obtained during the work shift, at least one of the first sequence, the second sequence, the line speed, or the number of vehicles predicted to exit the at least one assembly line during the work shift.

18. The method of claim 16, further comprising updating, during the work shift, based on an availability of parts during the work shift, at least one of the first sequence, the second sequence, the line speed, or the number of vehicles predicted to exit the at least one assembly line during the work shift.

19. A non-transitory computer-readable storage medium storing instructions, which when executed by at least one processor of a computer system, causes the computer system to carry out the method of claim 11.

\* \* \* \* \*